United States Patent

Kuznietz et al.

[15] 3,646,813

[45] Mar. 7, 1972

[54] CRYOGENIC-SENSING DEVICE USING URANIUM MONOPHOSPHIDE-URANIUM MONOSULPHIDE

[72] Inventors: Moshe Kuznietz, Chicago; Gerard H. Lander, Clarendon Hills, both of Ill.; Yehuda Baskin, Shaker Heights, Ohio

[73] Assignee: The United States of America as represented by the United States Atomic Energy Commission

[22] Filed: Sept. 9, 1969

[21] Appl. No.: 856,428

[52] U.S. Cl. .................................73/359, 73/343, 73/344, 236/74, 324/43 R
[51] Int. Cl. ................G01k 7/36, G05d 23/20, G01r 29/08
[58] Field of Search ...............73/359, 343, 344; 324/43, 47, 324/258; 23/346, 333; 236/74

[56] References Cited

UNITED STATES PATENTS 1,617,148  1/1929  Spooner.................................73/362
2,569,800  10/1951  Cataldo.................................236/74

OTHER PUBLICATIONS

An article in "Thermodynamics of Nuclear Materials 1967," proceedings of a symposium at Vienna 4– 8 September 1967, printed March 1968; the article entitled "Thermodynamic Properties of Uranium Compounds Part 4. Low-Temperature Heat Capacities and Entropies of US–UP Solid Solutions" by J. F. Counsell et al.; pages 385– 394.

"Handbook of Chemistry and Physics" Forty–Seventh Edition, pages F93, F94, F95; received by Scientific Library on Sept. 29, 1966.

Primary Examiner—S. Clement Swisher
Assistant Examiner—Denis E. Corr
Attorney—Roland A. Anderson

[57] ABSTRACT

The sensor of the present invention includes a solid solution of uranium monophosphide and uranium monosuplhide having a composition of $UP_{1-x}S_x$ where $x=0.2$ to $0.3$. The uranium monophosphide-uranium monosulphide solid solution is coupled to a temperature environment and a DC magnetic field, either of which may be varied and sensed. A sense coil is mounted adjacent the uranium monophosphide-uranium monosulphide solid solution to sense the magnetization of the uranium monophosphide-uranium monosulphide solid solution relative to the values of the temperature environment and magnetic field.

8 Claims, 5 Drawing Figures

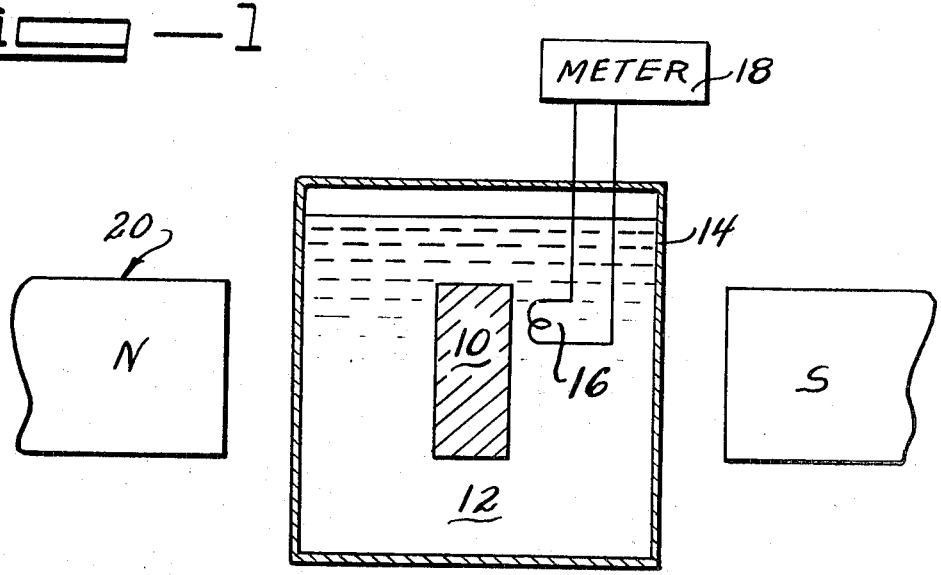
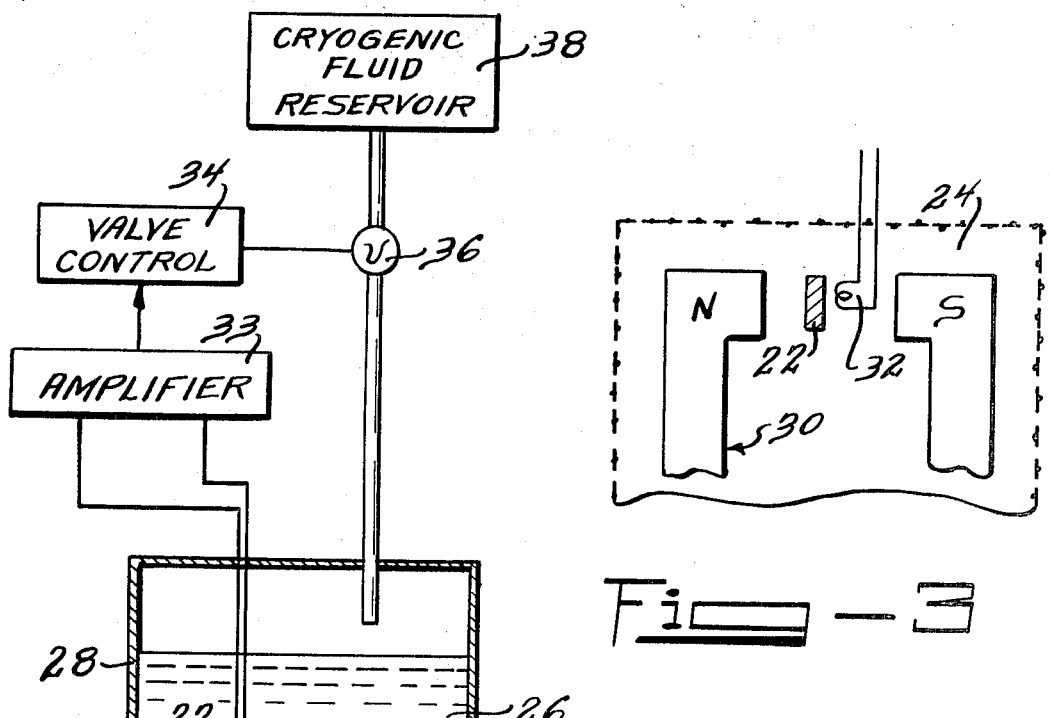
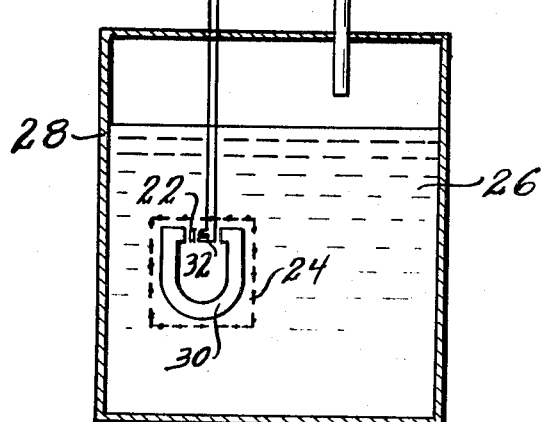

3,646,813

CRYOGENIC-SENSING DEVICE USING URANIUM MONOPHOSPHIDE-URANIUM MONOSULPHIDE

CONTRACTUAL ORIGIN OF THE INVENTION

The invention described herein was made in the course of, or under, a contract with the United States Atomic Energy Commission.

BACKGROUND OF THE INVENTION

This invention relates to sensing devices and more particularly to sensing devices responsive to changes in environment temperature and magnetic fields.

Applicants have discovered that their particular composition of a solid solution of uranium monophosphide (UP) and uranium monosulphide (US) possesses magnetic properties enabling the composition to form in combination a sensor of temperature and magnetic field strength.

In accordance with the present invention it is an object thereof to provide a sensor for measuring temperature.

It is another object of the present invention to provide a sensor for measuring magnetic field strengths.

It is another object of the present invention to provide an apparatus for the regulation of temperature or magnetic field strength.

Other objects of the present invention will become more apparent as the detailed description proceeds.

SUMMARY OF THE INVENTION

In general, the sensor of the present invention senses one of temperature and magnetic field and comprises a solid solution having a composition $UP_{1-x}S_x$ where $x=0.2$ to 0.3 and means for coupling the material to the magnetic field and temperature. Means are provided for varying one of the temperature and magnetic field and for measuring the magnetization of the solid solution responsive to the varied one of the temperature and magnetic field. The measure of the magnetization of the solid solution is a measure of the other of the temperature and magnetic field.

BRIEF DESCRIPTION OF THE DRAWINGS

Further understanding of the present invention may best be obtained by consideration of the accompanying drawings wherein:

FIG. 1 is a schematic drawing of a general embodiment of a sensor according to the present invention;

FIG. 2 is a schematic drawing of a sensor according to the present invention regulating environment temperature;

FIG. 3 is an enlarged view of the sensor in FIG. 2;

DETAILED DESCRIPTION OF THE PREFERRED EMBODIMENT

Figure 3A:
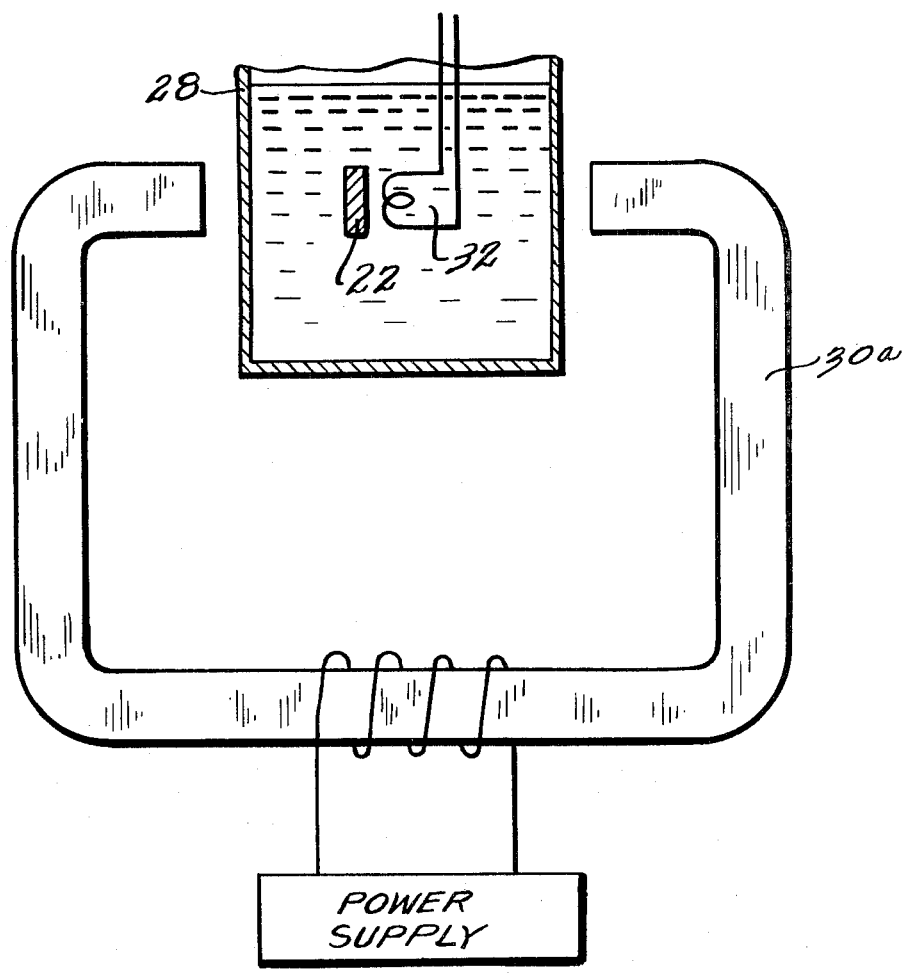
FIG. 3A is a schematic drawing of an electromagnet with the embodiment of FIG. 2.

The sensor of the present invention includes material which is a solid solution of uranium monophosphide and uranium monosulphide (UP-US). Uranium monophosphide and uranium monosulphide each have a face-centered cubic, sodium-chloride-type structure and are completely miscible. When they are combined they form compositions of the form $UP_{1-x}S_x$ which retain the sodium-chloride-type structure. In the practice of the present invention it has been discovered that the solid solution of uranium monophosphide and uranium monosulphide having a composition $UP_{1-x}S_x$, where $x=0.2$ to 0.3, exhibits unusual and unexpected magnetic properties. With this composition the solid solution of uranium monophosphide and uranium monosulphide is ferromagnetic from the Curie point down to 70° K. and antiferromagnetic below 15° K. From 15° to 70° K. the uranium monophosphide-uranium monosulphide solid solution having the aforedescribed composition has a ferrimagnetic structure when subject to a zero value external magnetic field. By applying an external critical magnetic field, the internal magnetic structure of the solid solution becomes ferromagnetic. The behavior of the uranium monophosphide-uranium monosulphide solid solution in this temperature range is characterized as its metamagnetic state.

The ferrimagnetic state of the uranium monophosphide-uranium monosulphide composition may thus be changed to a ferromagnetic state by subjecting the uranium monophosphide-uranium monosulphide composition to an external direct-current magnetic field. It has been further found that the value of the magnetic field strength necessary to effect the transition from the ferrimagnetic state to the ferromagnetic state in the uranium monophosphide-uranium monosulphide composition is inversely proportional to the temperature of the composition thus, for example, for a composition of $UP_{1-x}S_x$ where $x=0.235$ the ferrimetamagnetic state transforms to a ferromagnetic state at 3 kilogauss at 67° K. and 6 kilogauss at 43° K.

The sensor of the present invention embodies the aforedescribed uranium monophosphide-uranium monosulphide solid solution in the embodiment thereof illustrated in FIG. 1. In FIG. 1 the uranium monophosphide-uranium monosulphide solid solution is formed into a strip 10 which is disposed in a cryogenic liquid 12 housed in a container 14. A sensor coil 16 is mounted adjacent the UP-US strip 10 to detect changes in magnetic field therefrom. The output of the sensor coil 16 is fed to a suitable measuring meter 18. A magnet 20 is positioned to provide a DC magnetic field through the strip 10.

As stated, the sensor coil 16 is mounted adjacent the UP-US strip 10 to sense the ferrimagnetic to ferromagnetic transition state thereof and vice versa by current induced in the coil by such changes. Since the ferrimagnetic and ferromagnetic transitions are effected at unique temperature and magnetic field combinations for the UP-US strip 10, a relative measure of the value of the temperature and magnetic field is readily obtained. For example, with the UP-US strip 10 thermally coupled by immersion in the liquid 12 whose temperature is unknown and the solid solution of the strip 10 in a ferrimagnetic state, a change to a ferromagnetic state (detected by sense coil 16) in the presence of DC field from magnet 20 of 3 kilogauss indicates that the unknown temperature of the liquid 12 is 67° K. Conversely, when the temperature of the liquid 12 is known, a measure of the magnetic field from magnet 20 may be effected. Thus, if the liquid 12 is at a temperature of 43° K. and the solid solution 10 transforms from ferrimagnetic to ferromagnetic the strength of the magnetic field from magnet 20 is 6 kilogauss.

It is thus apparent that the sensor of FIG. 1 may be utilized to effect temperature and magnetic field measurements by varying the magnetic field and temperature respectively until a change from ferrimagnetic to ferromagnetic orientation occurs in the strip 10. At this time, the indicated value of the varied parameter fixes the unknown value of the other parameter. Thus, since the change from ferrimagnetic to ferromagnetic and from ferromagnetic to ferrimagnetic is sharp and distinct and results in a sharp and distinct change in the magnetization of the UP-US strip 10 and hence the output from the sense coil 16, the sensor of the present invention as generally illustrated in FIG. 1 may be used effectively as a sensor, a switch, or as a regulator.

The use of the sensor of the present invention as a regulator may be more fully appreciated by considering FIGS. 2 and 3. In FIGS. 2 and 3, a UP-US strip 22 is mounted in a mesh enclosure 24 disposed within a liquid 26 whose temperature is to be regulated. The mesh enclosure 24 allows thermal coupling between the liquid 26 and the UP-US strip 22. The liquid 26 is housed in a container 28. A magnet 30 is mounted within the mesh enclosure 24 to provide a DC magnetic field through the UP-US strip 22. A sense coil 32 is mounted adjacent the UP-US strip 22 to detect changes in the magnetic field therefrom. The output from the sense coil 32 is fed via an amplifier 33 to a valve control unit 34 whose output regulates the operation of a valve 36. Valve 36 connects the output from a cryogenic fluid reservoir 38 to the liquid 26 in container 28.

The magnetic field generated by magnet 30 is of a fixed value corresponding to the magnetic field value at which the UP-US strip 22 transforms from a ferrimagnetic to ferromagnetic state at the desired temperature of the liquid 26. With the liquid in the container 28 at a temperature such that the UP-US strip 22 subjected to the magnetic field from magnet 30 is in a ferrimagnetic state, that is the liquid 26 is below its desired temperature, no input will be received from the reservoir 38. As the liquid 26 in the container 28 heats up, the UP-US solid solution of strip 22 will transform from ferrimagnetic to ferromagnetic resulting in a particular polarity output from the sense coil 32 to the valve control 34 causing cryogenic fluid from reservoir 38 to be added to the liquid 26 in container 28 to effect cooling thereof. As the liquid 26 cools, a transition of the UP-US strip 22 from the ferromagnetic to ferrimagnetic state will occur shutting off the input from the reservoir 38. Thus, the liquid 26 in container 28 will be regulated to approximately that temperature at which for the magnetic field value from magnet 30 the UP-US strip 22 changes from a ferrimagnetic to a ferromagnetic state.

It will be further appreciated that the present invention is not limited to the structure shown in FIGS. 2 and 3, but extends to other equivalents thereof; for example, the magnet 30 may be external to the liquid and may be of an electromagnet design as illustrated in FIG. 3A. A gas may be substituted for the liquid and thermal coupling other than that shown may be effected to the environment being regulated.

Figure 4:
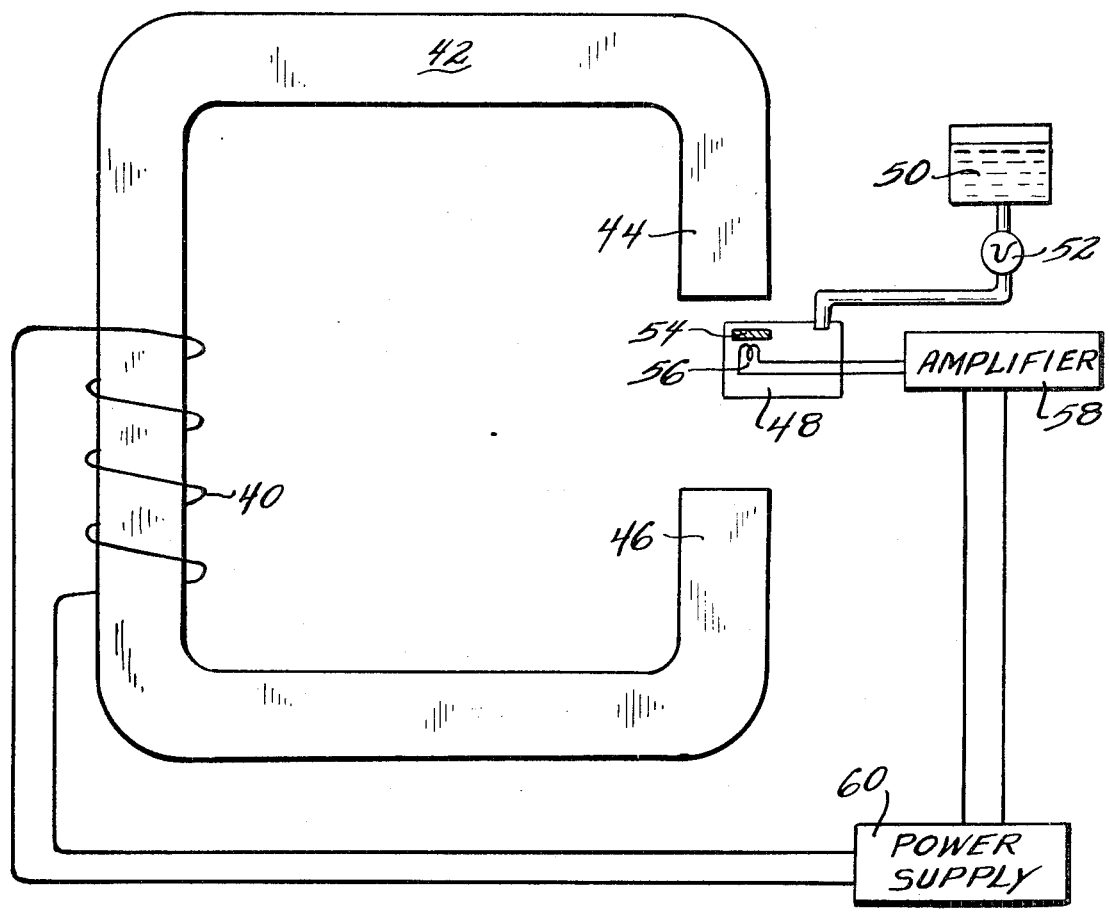
FIG. 4 is a schematic drawing of a sensor according to the present invention regulating a magnetic field.

Conversely, the sensor of the present invention may be utilized to regulate the value of a magnetic field as shown in FIG. 4. In Fig. 4 variable magnetic field is generated by a coil 40 disposed about a ferrite 42 having pole faces 44 and 46. Between the pole faces 44 and 46 is mounted a container 48 having an internal environment at a predetermined temperature. In the embodiment of FIG. 4, the internal environment is a cryogenic liquid whose temperature is maintained from a cryogenic reservoir 50 via a valve 52. In the environment of container 48 a UP-US strip 54 having a composition $UP_{1-x}S_x$, where $x=0.2$ to 0.3 is mounted so as to be subject to the magnetic field between the pole faces 44 and 46 of ferrite 42. A sense coil 56 is mounted adjacent the UP-US strip 54 to detect changes in magnetic field therefrom. The output from sense coil 56 is fed via an amplifier 58 to a power supply 60 which in turn controls the current flowing through the winding 40 on ferrite 42.

In operation, with the UP-US strip 54 at a predetermined temperature in the ferrimagnetic state, an increase in the magnetic field between the pole faces 44 and 46 will cause the UP-US strip to transform from the ferrimagnetic to the ferromagnetic state and give a resulting output from the sense coil 56. The output from the sense coil 56 regulates the output from the power supply 60 to decrease the magnetic field between pole faces 44 and 46 until the UP-US strip 54 transforms from ferromagnetic to ferrimagnetic. Thus, the sensor comprising the coil 56 and strip 54 will regulate the magnetic field between the pole faces 44 and 46 about a value determined from the temperature of the UP-US strip 54 at its metamagnetic transition point. It will also be appreciated that the present invention should not be limited to the embodiment shown in FIG. 4 but that other equivalents may be utilized for example in the cooling structure and environment for the sensor.

It will be further appreciated that the sensor of the present invention may be used with the embodiments illustrated in FIGS. 2-4 as a switch sensor. In this structure, a variable, either temperature or magnetic field, may be increased or decreased to a predetermined value (determined from the associated magnetic field or temperature range at which magnetic transformation of the UP-US strip occurs) to which the sensor is exposed at which point switching is effected.

While specific examples of the sensor in the invention have been set forth herein, it is not intended that the invention be limited solely thereto but to include all the variations and modifications falling within the scope of the following claims.

The embodiments of the invention in which an exclusive property or privilege is claimed are defined as follows:

1. A device for measuring one of temperature of an environment and magnetic field comprising a solid solution having a composition $UP_{1-x}S_x$ where $x=0.2$ to 0.3, means magnetically coupling said solution to said magnetic field, means thermally coupling said solution to said environment, means for varying one of said environmental temperature to a maximum value of 70° K. and said magnetic field, and means for sensing the change in magnetization of said solid solution responsive to said varied one of environmental temperature and magnetic field, at which change in magnetization the value of said varied one of said environmental temperature and magnetic field is a measure of the other of said environmental temperature and magnetic field.

2. The apparatus of claim 1 wherein said magnetization sensing means comprise sense coil means cooperatively mounted with said solution to sense changes in magnetic fields therefrom.

3. The apparatus according to claim 1 further including means coupled to said magnetization change sensing means for regulating the varied one of said temperature and magnetic field in accordance therewith.

4. A device for measuring the temperature of an environment comprising a solid solution thermally coupled operably to said environment to a maximum value of 70° K. and having a composition of $UP_{1-x}S_x$ where $x=0.2$ to 0.3, means for generating a known magnetic field and magnetically coupling said solid solution thereto, and means for sensing the change in magnetization of said solid solution which change in magnetization is a function of said environmental temperature and said magnetic field.

5. The apparatus according to claim 4 further including a heat source, and means coupled to said magnetization-sensing means for connecting said heat source to regulate said environmental temperature in accordance therewith.

6. A magnetic field sensor comprising a solid solution magnetically coupled to said magnetic field and having a composition $UP_{1-x}S_x$ where $x=0.2$ to 0.3, means for generating a known temperature environment and thermally coupling said solution thereto, and means for sensing the change in magnetization of said solid solution which change in magnetization is a function of said magnetic field and temperature.

7. The apparatus according to claim 6 wherein said environment and coupling means provide a temperature environment variable to a maximum value of 70° K.

8. The apparatus according to claim 6 further including means for varying said magnetic field, and means coupled to said magnetization-sensing means for regulating said magnetic field varying means in accordance therewith.

\* \* \* \* \*